US007874008B2

(12) United States Patent
Chang et al.

(10) Patent No.: US 7,874,008 B2
(45) Date of Patent: Jan. 18, 2011

(54) DYNAMICALLY CONFIGURING EXTENSIBLE ROLE BASED MANAGEABLE RESOURCES

(75) Inventors: David Yu Chang, Austin, TX (US); John Yow-Chung Chang, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/468,067

(22) Filed: Aug. 29, 2006

(65) Prior Publication Data

US 2008/0072316 A1     Mar. 20, 2008

(51) Int. Cl.
*G06F 7/04*     (2006.01)
*G06F 17/30*     (2006.01)
*H04N 7/16*     (2006.01)

(52) U.S. Cl. .............................. 726/27; 726/21; 726/1
(58) Field of Classification Search ............... 726/1, 726/21, 27, 26
See application file for complete search history.

(56) References Cited

U.S. PATENT DOCUMENTS

| | | | | |
|---|---|---|---|---|
| 6,105,063 | A * | 8/2000 | Hayes, Jr. .................. 709/223 |
| 6,606,711 | B2 * | 8/2003 | Hill et al. ....................... 726/7 |
| 7,130,885 | B2 * | 10/2006 | Chandra et al. ............ 709/206 |
| 7,454,786 | B2 * | 11/2008 | Chang et al. ................. 726/14 |
| 7,546,640 | B2 * | 6/2009 | Chang et al. ................. 726/28 |
| 7,620,885 | B2 * | 11/2009 | Moulckers et al. .......... 715/201 |
| 2001/0011341 | A1 * | 8/2001 | Hayes, Jr. et al. ............. 712/11 |
| 2005/0021383 | A1 | 1/2005 | Fliess et al. |
| 2005/0102536 | A1 | 5/2005 | Patrick et al. |
| 2005/0172149 | A1 | 8/2005 | Xu et al. |
| 2008/0263543 | A1 * | 10/2008 | Ramachandran ............ 717/177 |

OTHER PUBLICATIONS

U.S. Appl. No. 11/351,035, Chang et al.
"Using Java Security to Protect WebLogic Resources" http://d-docs.bea.com/wls/docs90/security/server_prot.html, accessed Aug. 29, 2005.
"Securing WebLogic Resources" http://e-docs.bea.com/wls/docs81/secwires/secroles.html, accessed Aug. 29, 2005.
"Context-Aware Dynamic Access Control for Pervasive Applications", Zhang et al., http:www.caip.rutgers.edu/TASSL/Papers/automate-sesame-cnds-04.pdf, 2004.
"Universal IdP™: Universal Identity Manager (IM)," Open Network, cache of http://www.opennetwork.com/solutions/functionality/im/, accessed Aug. 29, 2005.

(Continued)

*Primary Examiner*—David Garcia Cervetti
(74) *Attorney, Agent, or Firm*—The Brevetto Law Group (57) ABSTRACT

Methods and systems are provided for dynamically altering the capabilities of a software application in response to a request from a user to perform an action in the application. Based on the user's security role, the software application is reconfigured by either granting access to the user to an existing component of the application, or if no suitable component is available, adding an external vendor component to the software application which is suitable for performing the requested action.

14 Claims, 6 Drawing Sheets

OTHER PUBLICATIONS

Bhatti et al., "XML-Based Specification for Web Services Document Security," IEEE, pp. 41-49, Apr. 2004, http://web.ics.purdue.edu/~bhattir/academics/research/papers/IEEE_Computer_APR04.pdf.

Fernandez, "Enterprise Dynamic Access Control (EDAC): Overview," Prepared for Commander, US Pacific Fleet, Pearl Harbor, May 1, 2005.

Himanshu Khurana, "Integrated Security Services for Dynamic Coalition Management," Electrical and Computer Engineering Dept., Univ. of Maryland, DARPA DC PI Meeting, Jul. 25, 2003, http//www.ece.umd.edu/~gligor/ISSDCM2003/DARPA_DC_PI_Meeting_07_2003.pdf.

"Role and Rule-Based Provisioning," Beta Systems Software AG, 2003-2005, http://www2.betasystems.com/en/portfolio/products_solutions/securitymanagement/sam/ht_rolebased_prov.html.

* cited by examiner

DYNAMICALLY CONFIGURING EXTENSIBLE ROLE BASED MANAGEABLE RESOURCES

RELATED APPLICATIONS

The present application is related to the application owned by the same assignee of U.S. patent application Ser. No. 11/351,035 filed Feb. 9, 2006 entitled "Extensible Role Based Authorization for Manageable Resources".

BACKGROUND

1. Field

The present invention relates to software, and more specifically to methods and systems for configuring a software system.

2. Background

Figure 1:
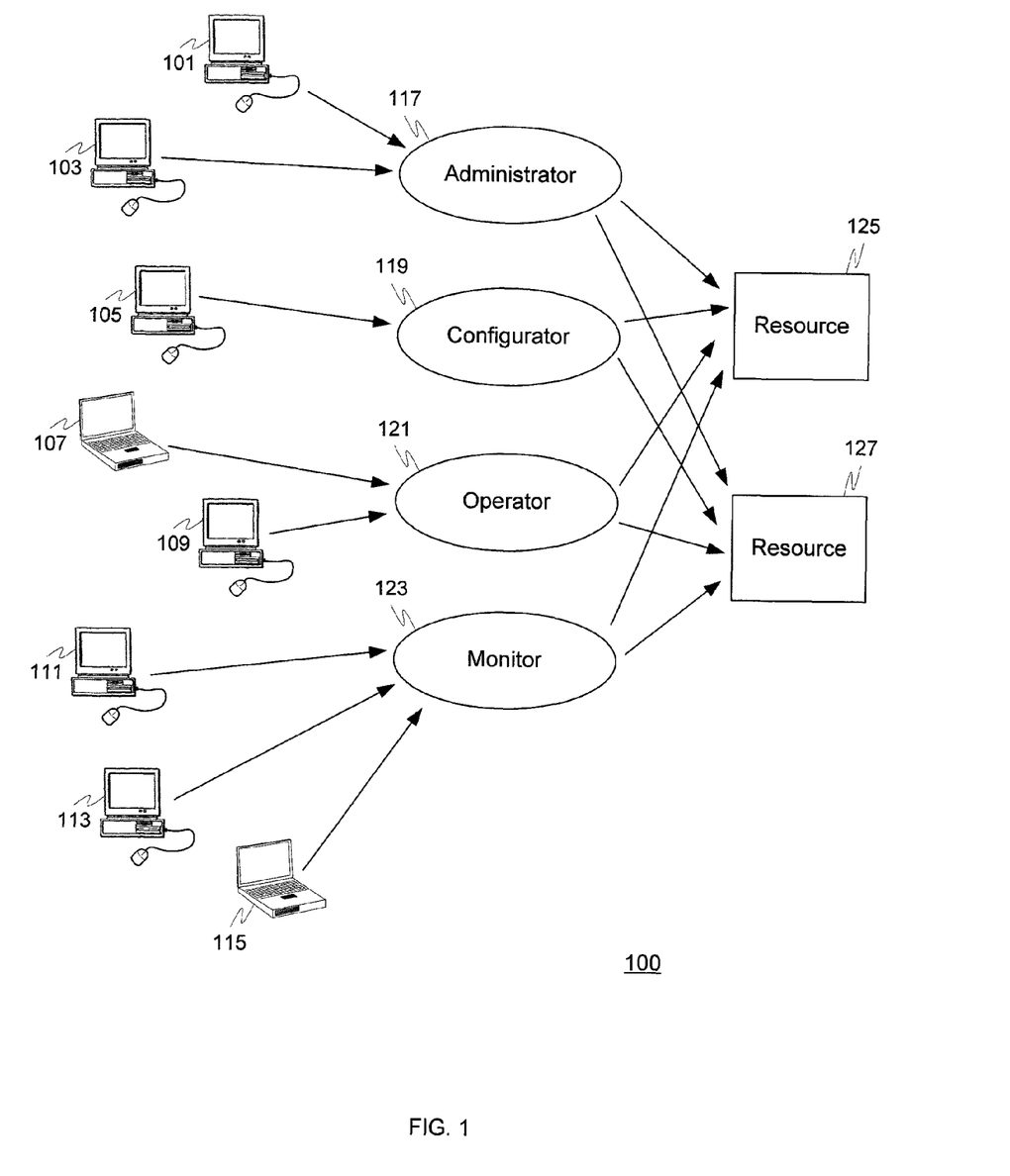
FIG. 1 depicts an administrative security arrangement with statically defined roles for granting authorization to manageable resources.

FIG. 1 depicts the security arrangement 100 in a complex administrative software application for limiting access to the resources of the application—that is, to the data used in the application. Complex administrative software applications often have many components with which users can view or interact with the resources associated with the application. Quite often components are added over time to provide more capabilities to the application. The administrative software for each component should be secured so that authorized users can administer each component. However, the various different software components may have any one of several different security constraints. Access Control List (ACL) is one conventional approach for securing administrative software components. ACL serves as an access control mechanism by maintaining and referring to an access control list for each object on a computer to determine whether a particular user is to be given access. Each object is assigned a security attribute identifying its access control list, and the list has an entry for each user with access privileges, such as the ability to read a file, write to the file, or execute the file. Conventional security arrangements, such as ACL, suffer from the drawback of inflexibility.

The security arrangement of FIG. 1 is a user authorization scheme in which users 101-115 are granted authorization to access manageable resources 125 and 127 based on the pre-defined role to which each respective user has been assigned. Administrative security systems generally have a number of defined roles for users. FIG. 1 depicts four roles which are used in some IBM systems, Administrator 117, Configurator 119, Operator 121 and Monitor 123. These roles may be defined as static roles, with each user assigned to a particular role having the authorization to access the resources of the system at a predefined capability for that role. In the example shown in the figure, each of the roles 117-123 can access all resources—resources 125-127—at the predefined capability for that role. For example, user 101 has been assigned the Administrator 117 role, and therefore has authorization for Administrator level access to all resources, e.g., Resource 125 and Resource 127.

Such approaches which rely upon statically defined roles for granting access sometimes create a problem due to inflexibility. For example, it may be desirable for a user with an administrator role for one resource to not have the administrator role for other resources. As shown in FIG. 1, user 101 and user 103 are both granted the Administrative role 117, and therefore both users can access all the resources in the system as Administrators, in this case, Resource 125 and Resource 127. In some situations a user may request access to one of the resources for performing an action which the application does not have the ability to perform. It would be desirable to be able to add the capability of performing a requested action without requiring a human administrator to perform all of the activities required to reconfigure the application.

What is needed is a way to identify the right software or software component that matches the user's security role and dynamically configure or add new components to the base software.

SUMMARY

Embodiments disclosed herein address the above stated needs by providing systems and methods for identifying the right software or software component that matches the user's security role and dynamically configuring the capabilities of a software application in a computer based application.

In at least one embodiment, the application is configured to detect a request from a user to perform an action, determine whether the resources or components of the existing application configuration are suitable for performing the action. If the existing application configuration is not capable or is not suitable for performing the action the application determines whether there are one or more vendor components available for performing the action, and provides a list of any such available vendor components.

In some embodiments there may be several available vendor components and/or existing components which are suitable for performing the action. A list may be provided for the administrator showing the available vendor components and existing components. In some embodiments the application may automatically add a new vendor component in order to perform the requested user action.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 2:
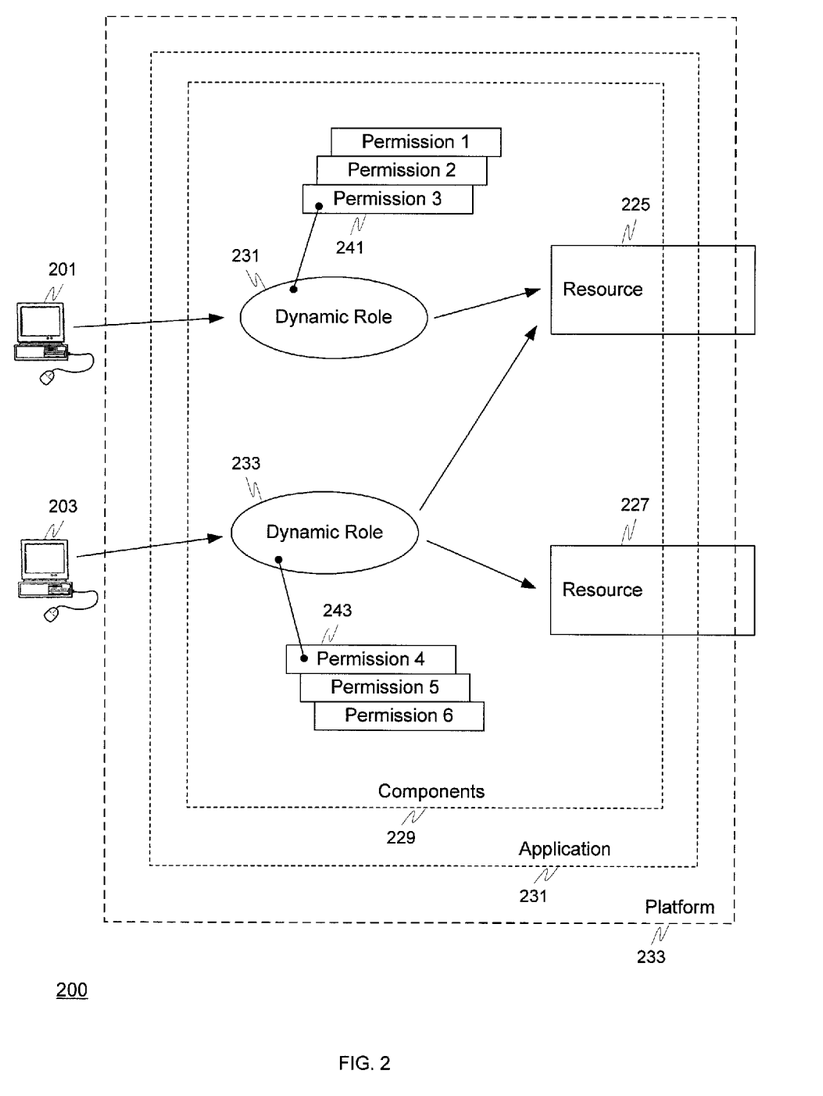
FIG. 2 depicts an exemplary system 200 which may be used to implement an administrative security arrangement for granting authorization to manageable resources according to various embodiments of the invention.

Various embodiments disclosed herein enable the dynamic creation of new roles or alteration of existing roles associated with permissions which allow users to access the manageable resources of a software application. A user's dynamic role and associated permissions allows the user to have different permissions and authorities for different resources. In this way, when a new manageable resource is created the administrator can create dynamic roles which are associated with the required permissions for that resource for the users who have differing needs for access to the resource. In some embodiments, a software application may have an initial set of role definitions and associated permissions, and new roles and permissions may be dynamically added after the application has been deployed, for example, to accommodate new components being added to application. FIG. 2 depicts a system 200 which may be used to implement an administrative security arrangement for granting extensible role-based authorizations to manageable resources. FIG. 2 also illustrates an exemplary relationship between a platform 233, an application 231, components 229 and resources 225-227, all of which are terms used herein to explain the various embodiments.

A platform 233, as this term is used herein, is a software framework, possibly including some aspects of hardware, which allows software applications 231 to run. A platform 233 may include an operating system, programming languages and/or their runtime libraries, as well as the computer's architecture, or selected aspects of it. A platform 233 may simply be thought of as a place to launch or operate software applications 231 or components 229. One example of a software platform is IBM's WebSphere Application Server. There are a great number of other examples of platforms, including, for example, IBM's Eclipse, an open integrated development environment (IDE) for creating web applications. Many other software platforms exist as well, as known by those of ordinary skill in the art.

An application 231 is a software program or code which runs on a platform 233 to perform a given purpose, satisfy a stated need, or manipulate and display resources in a desired manner. An application may be called a computer based application if its platform runs on a computer, server or other such state device. An application 231 may include, or be created from, a number of components 229. (A platform 233 may also include components separate from the application (not shown) which support functions of the platform 233 but are not directly part the application 231.) Software components 229 may take the form of modules, extensions, or custom configurations associated with an application. There are many examples of components which may be used as part of an application launched on a platform. Components may be thought of, in a sense, as the building blocks of an application (or a platform). Quite often components are subprograms, routines or bit of code that perform specific tasks. There are many examples of components used by developers to create applications. The extensible components that may be launched from the WebSphere platform include, for example, WebSphere Business Integration (WBI), WebSphere Portal and Java Message Service (JMS). Additional components such as these can be added to a platform such as WebSphere based on the requirements of the system or business for the platform.

The term resources, as this term is used herein, refers to the data used within or accessed by an application 231. In some implementations, the data of resources, for example, the resources 225-227 shown in FIG. 2, may be stored in a file separate from the application 231 and accessed by the application 231 or a component 229 of application 231. The resources 225-227, or a portion of them, may, in some instances, be stored as part of the application 231 itself or the application's components 229. As data, the resources 225-227 typically do not act on the application 231 or its components 229, but rather, the resources 225-227 are acted upon, edited, added to, deleted, or otherwise manipulated, by the application 231 and/or the components 229 of the application 231.

Terminals 201 and 203 shown in FIG. 2 represent users with user accounts authorizing them to interact with the application 231. A user with a user account is typically authorized in some capacity to access one or more resources associated with a software application running on a platform. For example, a user with a user account may be a person who has an on-line stock brokerage account, and by entering a user identification number and password the person may access their on-line stock brokerage account, and may view its information or enter commands to make stock trades. The term user may refer to any person authorized to access the application's resources by using a user account at a computer terminal connected to a network, or otherwise connected to a server. For ease in explaining the various embodiments, the terms "user" and "user with a user account" are used interchangeably in places herein in describing the invention, although in actuality a user account may be part of the system whereas a user (person) is not typically part of the system. Since a user accesses the platform via a computer by using a user account, the elements 201 and 203 of FIG. 2 are shown as computers rather than human users, but are referred to as users 201 and 203. In order to access or otherwise log on to an application 231 running on the platform 233, the users 201-203 may need to enter a password, enter an account number, connect a dongle or other identification hardware, impress a fingerprint or provide other biometric identification, or otherwise prove identification in a like manner known to those of ordinary skill in the art.

In understanding some of the terms used in describing the various embodiments, it may be useful to consider a real-world example involving a platform, an application, components and resources. Take, for example, a software system in a bank. The banking software may include a banking software application built on a WebSphere platform. The banking software application may have many different components, including modules or subroutines which perform the myriad different functions of the banking software application. The banking software application may allow users to access and manipulate resources (e.g., data) of the banking software application. The users may have many different roles, entitling them to gain access to a given set of resources at different levels and capabilities based on the permissions associated with a user account of each respective user. For example, the user roles may include a bank manager, a software programmer working for the bank, several bank tellers, customers with checking and savings accounts, customers with checking accounts and loans, customers with several different accounts and an Internet account, and the like. The resources may be the data for the various types of accounts, that is, checking accounts, savings accounts, loan accounts, and so on. So a user with a checking account and capabilities for Internet access will be assigned permissions to view data for her account either in person, via the Internet or possibly though the use of an automatic teller machine (ATM). However, the user will not be granted the permission to see other people's accounts, and the user will not be granted the permission to change the values in her account. On the other hand, a user who is a teller may be granted the permissions needed to access resources (data) from all banking customers. But in some banks the teller may not be able to alter account values to fix a bank error. The bank manager may have all the permissions of the tellers, but in addition she may be able to make changes to accounts to fix a minor bank error or take other such actions. The computer programmer employed to maintain and administrate the bank application software may be able to access the code, perform maintenance, and install software updates and patches, but would normally not be able to change the monetary values in the customers' accounts.

FIG. 2 depicts a system 200 having resources 225-227 which are accessed by users 201-203 via the components 229 and/or the software application 231. In the exemplary embodiment illustrated in the figure, access to the resources 225-227 is respectively granted to the various users based on the users' dynamic roles 231-233 and their associated permissions. The dynamic role for a given user specifies what resources the user is authorized to access. The permissions associated with that dynamic role specify the capacity, or capabilities or other manner in which the user is authorized to interact with a resource. In the example depicted in FIG. 2, dynamic role 231 allows user 201 to access resource 225. The permissions 241, which are associated with dynamic role 231, define the capacity in which the user 201 will be able to access resource 225.

The dynamic roles, such as the dynamic roles 231-233, are typically implemented using components 229. But in some embodiments the dynamic roles 231-233 may also be implemented as part of the application 231 itself. The various embodiments provide a robust, yet flexible, system of security by granting the user 201 access to resource 225 based on the dynamic role 231 which is characterized by the set of permissions 241 associated with this dynamic role. When a new resource is created or added to an application, new permissions may be created to selectively give the appropriate users access to the new resource and new roles may also be dynamically created.

As depicted in FIG. 2, dynamic role 233 allow user 203 to access both resource 225 and resource 227. As mentioned above a user's permissions, which are associated with the user's dynamic role, specify what capacity the user can access the various resources the user is authorized to access. The capacity in which user 203 can access resources 225 and 227 is defined by the permissions 243 granted to user 203. In accordance with various embodiments disclosed herein, a user's bundle of permissions associated with the user's dynamic role need not define the user to have the same privileges and capacities for all resources that the user can access. The user may have a greater or lesser capacity for accessing some resources as compared to others. The permissions 243 may define different privileges and capacities for the user 203 to access resource 225 versus accessing resource 227. For example, the permissions 243 (e.g., permission 4) may afford user 203 privileges of reading data when accessing resource 225, while the permissions 243 (e.g, permissions 5 and 6) could afford user 203 privileges to add, delete and edit data when for accessing resource 227.

The various embodiments disclosed herein can dynamically associate a set of permissions to the dynamic role of a user which apply in virtually any predefined manner of accessing the different resources for which the user is authorized. The dynamic roles and associated permissions are not limited to the four roles mentioned in the Background which are statically defined roles. The four roles mentioned in the Background—Administrator 117, Configurator 119, Operator 121 and Monitor 123—are examples of static roles internally defined by IBM for managing resources. For example, in accordance with some IBM systems which use statically defined roles, the Administrator role 117 is considered a super role, meaning that a user granted the Administrator role 117 can access all resources and perform almost any action. In such IBM systems with statically defined roles, a user granted the Configurator role 119 can only perform configuration changes to the resources (e.g., set properties or attributes of the resources managed). Similarly, IBM's Operator role 121 can perform some operations (e.g., perform some action on a managed resource) and users assigned the Monitor role 123 can only watch what is going on (e.g., observe the status of the managed resource). IBM has defined these roles in some software systems to manage the resources and isolate one user from other user so that each user has different responsibilities. Other systems using statically defined roles may need different roles defined for a particular function within the company or organization. For example, a banking software system may need a statically defined Manager role and statically defined Teller roles, and possibly customer roles. In another example, a company may have Employer and Employee roles. This differs from the dynamic creation of roles in which associated permissions provides the administrator of the application 231 with enough flexibility to tailor the bundles of permissions given to each particular user which closely suits the access requirements and needs that a particular user has for each resource. For example, by using the various embodiments herein a particular user may be assigned permissions giving the user right akin to that of an administrator for some predefined resources, and at the same time give the user rights akin to a monitor for other predefined resources. Of course the user's rights or permissions need not conform to any particular predefined role for any resource. Rather, the bundle of permissions may be tailored to specifically suit any situation or need that arises.

Typically, an administrator of the application 231 is provided with the authority to assign or otherwise associate dynamic roles to particular users or to classes of users. It should be noted that the ability to assign dynamic roles is itself a permission, and need not necessarily be tied to a predefined "administrator" role in the conventional sense. However, in an effort to ease the explanation of the various embodiments, the assignment of dynamic roles will be discussed in terms of being done by an administrator. As mentioned above, the administrator is not constrained to assigning predefined roles, and thus each resource can be uniquely accessed by different users depending up their access needs, the security needs of the application, or the preferences of the administrator making the assignment. The administrator may tailor a set of permissions for a given user, for a class of users, or even for a particular situation or a predefined timeframe. Referring to the banking software application discussed above, a situation may arise occasionally when a bank auditor comes to the bank to audit the books or inspect various accounts. The auditor may be set up as a use with a customized set of permissions allowing the bank auditor to access all resources (e.g., bank-related records and data) and possibly make print-outs, but not alter any of the resources. The bank auditors dynamic role may be set up to expire after a certain period of time, or possibly after a certain number of records or other measure of data have been inspected, edited or otherwise accessed. Such a dynamic role created on a temporary basis with tailored permissions, and often for a particular situation, may be referred to as a temporal role.

The various embodiments allow for new security roles and their associated permissions to be dynamically created. In this way the security and access policies for an application can be changed over time, or for a given situation. For example, new applications are sometimes added to a platform to provide additional capabilities. When this happens, one or more new permissions may be needed to manage the new application. The new permissions can be dynamically added at any time, for example, after the initial permissions have been set in place and implemented. These new permissions can either be dynamically added to the existing roles, or a new role can be created to manage the new application. When an application is removed, the previous permission associated with the removed application is typically removed as well. This aspect of the various embodiments differs from other conventional solutions in which the roles are predefined and constrained to certain permissions or lists of permissions. Such conventional solutions make the system inflexible.

For the ease of illustration, FIG. 2 depicts one user associated with each dynamic role. However, the various embodiments may be implemented with any number of users associated with a particular dynamic role. For example, dynamic role 231 could define the permissions for an entire class of users, and possibly be associated with hundreds or thousands of users, or more. On the other hand, a dynamic role may be tailored for a particular individual. For example, dynamic role 203 may define a unique bundle of permissions associated only with user 203. The various embodiments afford a great deal of flexibility in associating permissions with one or more users, and tailoring those permissions to meet the access needs of the system while maintaining the security requirements.

Figure 3:
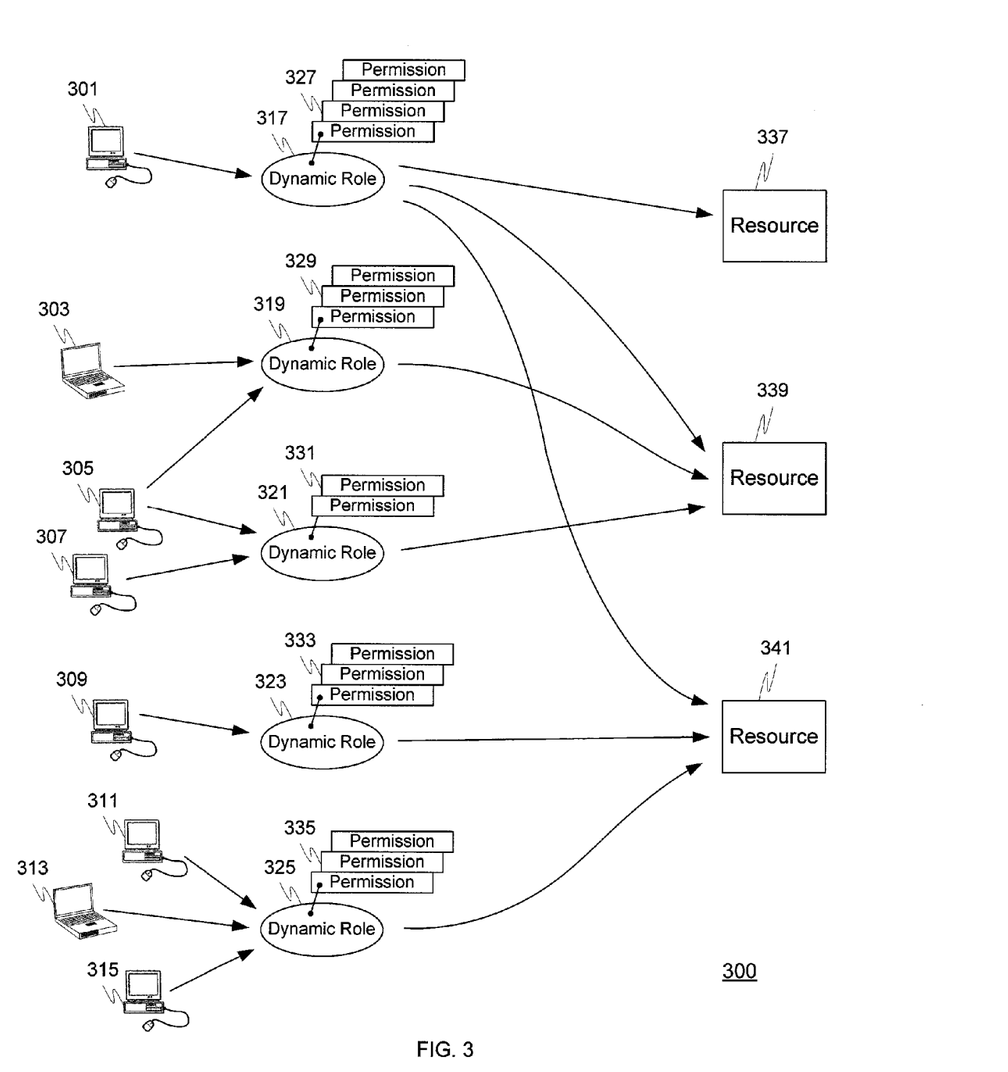
FIG. 3 depicts an exemplary system 300 for granting extensible role-based authorization to manageable resources according to various embodiments of the invention.

FIG. 3 depicts an exemplary system 300 for granting extensible role-based authorization to manageable resources. One aspect of the access scheme for role based authorization is the resource to role mapping which characterizes the resource permissions. The mapping between resources and roles describes the roles used to administer a given resource. The mapping of resources to roles can be seen by the arrows between resources 337-341 and dynamic roles 317-325, with each of the dynamic roles being respectively defined by a bundle of permissions 327-335. The mapping between resources and roles may be kept in the form of a list, a table, a set of pointers or reference indices, or any other convenient means of tracking the relationship mapping between resources and roles.

Another aspect of the access scheme for role based authorization involves mapping between roles and users. The mapping of dynamic roles to users defines which users are granted various roles. This, in turn, determines what different resource(s) each user may access. The permission(s) associated with a given dynamic role determines the capacity in which the user's access is defined. The mapping of roles to users may be seen in FIG. 3 by the arrows between dynamic roles 317-325 to users 301-315. In some embodiments, each user may map to a particular dynamic role. If a user needs more permissions or a combination of permissions not defined by any existing dynamic role, then a new dynamic role may be created. However, in other embodiments a particular user may be associated with more than one dynamic role. For example, user 305 is associated with both dynamic role 319 and dynamic role 321. The mapping between roles and users may be kept in the form of a list or a table such as an authorization table.

When a new administrative component is added to the application, resource permission for the resources associated with that component may also be added. This can be described in an XML file similar to the deployment descriptor of a J2EE application. Once the resource permissions for the added component have been added, the authorization table (e.g., the user to role mapping) corresponding to that component is added.

Figure 4A:
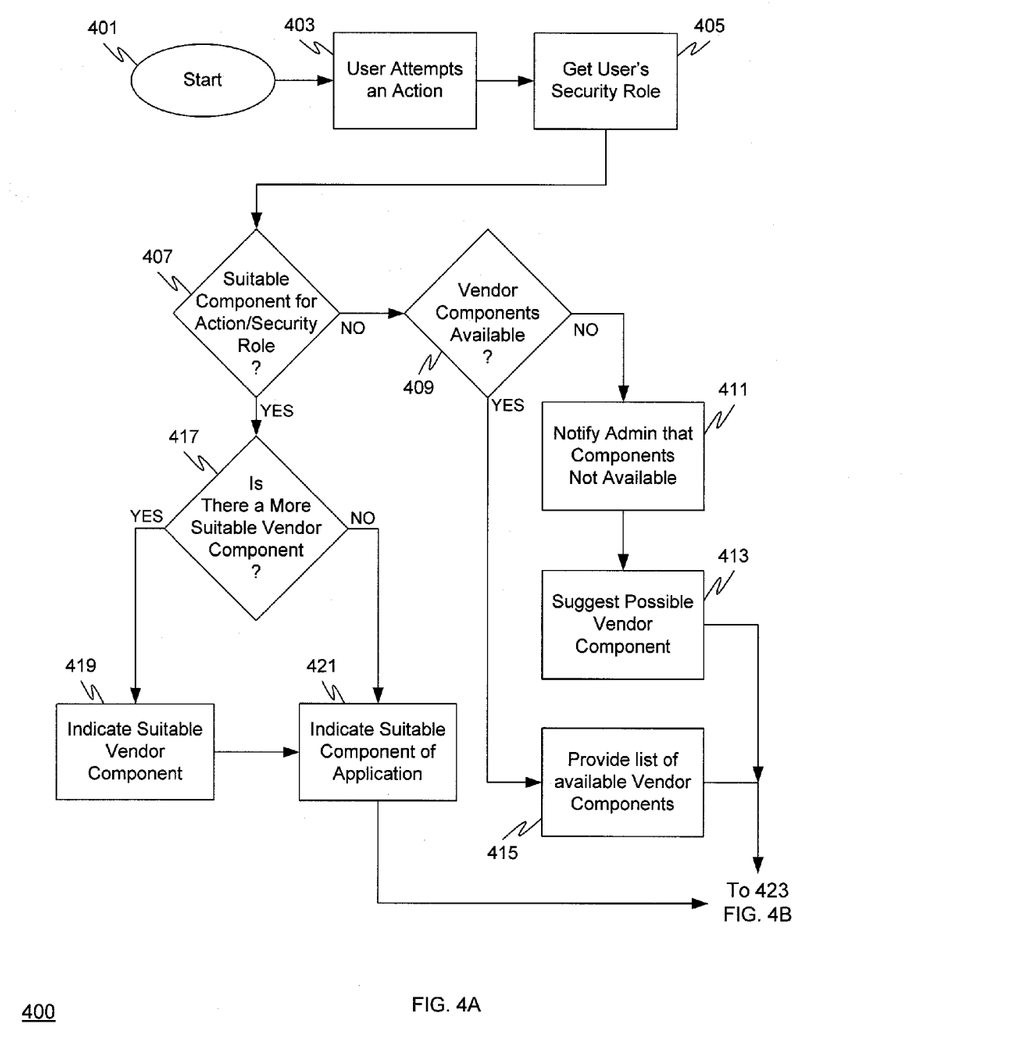
FIGS. 4A and 4B depict a flowchart 400 of an exemplary process for managing the component capabilities of a software application according to various embodiments of the invention.
Figure 4B:
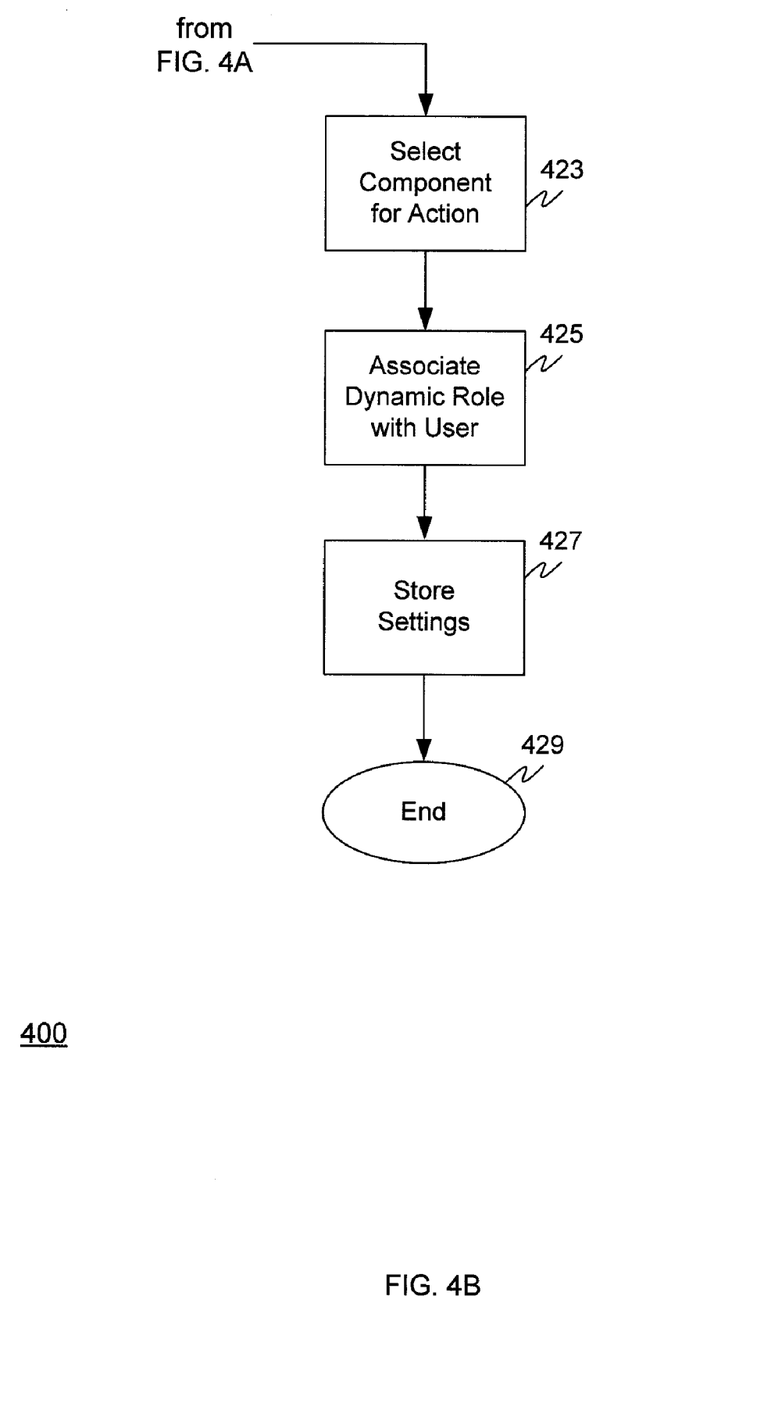

FIGS. 4A and 4B depict a flowchart 400 of an exemplary process for managing the component capabilities of a software application. The method starts at 401 of FIG. 4A and proceeds to 403 where the application detects a user attempting to request an action. The action may be any activity a user would perform with a computer application, including, for example, accessing and/or manipulating any of the data in a multiuser database, a graphics platform, a word processor, a spreadsheet application, a financial account (e.g., a bank account at a bank's automated cash machine or website portal). The action may involve accessing, editing, viewing, transmitting, receiving or otherwise manipulating data (e.g., images, text, numbers or other digitally stored information). Typically the software application detects a user seeking to perform an action. In some instances the software application may include a component configured to detect users attempting an action. Upon detecting a user seeking to perform an action with the software application in block 403, the method proceeds to 405.

In 405 the user's security role is retrieved in response to detecting a user attempting an action back in 403. The security role determines the extent of access the user has to access various resources and authorization to manipulate or modify the system's resources. For example, a user with a user account is typically authorized in some capacity to access the resources of a software application running on the platform, with the extent of access and authority being based on the user's security role. A user's security role may have one or more permissions associated with it which grant the user various access and authorities within the application. The security role and/or permissions may be stored as a file which is part of, or associated with, the user account information for a particular user. Once the security role has been retrieved in 405 for the user attempting an action the method proceeds to 407.

In 407 it is determined whether the application includes components or other logic capable of performing the desired action, given the security role of the user requesting the action. For example, it is determined whether the existing configuration of the software application is able to perform the action. If the application does not have any components suitable for performing the desired action then the method proceeds from 407 in accordance with the "NO" branch to 409 to consider resources outside of the application such as vendor components. In 409 a suitable software or software component is identified that matches the user's security role. The system may then dynamically configure or add the new component(s) to the base software, that is, to the existing configuration of the application. In some embodiments the application may be preconfigured to check one or more vendor websites for available components which are capable of performing the action. This may entail checking the website of the application retailer or OEM (original equipment manufacturer), or other websites known to deal in components or application software. In some embodiments the application itself may contain a list of additional components, not yet added to the application, which are able to perform various actions. In such embodiments block 409 may be performed by reference to the list of components associated with the application. This sort of a list of available outside components may optionally be updated from time to time in the application, so as to include new, recently released components and updated versions of existing components. In 409 the application checks for outside components which are suitable for performing the action detected in block 403, based on the features and parameters needed for the action.

If it is determined in 409 that there are one or more suitable vendor components available, the method proceeds along the "YES" branch to 415 to provide a list of suitable vendor components for the administrator of the application. The list of suitable components typically contains sufficient information to aid the administrator in making a purchasing decision regarding the new components. In some embodiments, rather than merely providing a list of vendor components, the application may be configured to automatically acquire the needed component from the vendor, either as a permanent purchase or on a trial basis. That is, the application "automatically" acquires by performing one or more steps to acquire the component (e.g., downloads a new software component) without intervention from a human administrator. In such embodiments block 415 notifies the administrator of any vendor component which has been acquired. Upon completing 415 the method then proceeds to 423 of FIG. 4B. Back in 409, if it is determined that there are no known vendor components available, then the method proceeds along the "NO" branch to 411 to notify the user that there are no known available vendor components to perform the action. The method then proceeds to 413 where a list is provided to the administrator suggesting one or more vendors who deal in components for the application and may possibly have a component suitable for the requested action. The method then proceeds from 413 to 423 of FIG. 4B.

Back in 407, if it is determined that the application does have at least one component capable of performing the desired action then the method proceeds in accordance with the "YES" branch to 417. In some instances it may turn out that the application includes a single available component capable of performing the action, while in other instances the application may have multiple components or a combination of components able to perform the action. In either situation it may be the case that there is a vendor component known to be more suitable than any component in the existing software application for performing the action. This includes situations in which a vendor component is known to provide capabilities for performing the action which differ from those of any component presently part of the application. If there is a vendor component which is judged to be particularly suitable for performing the action, the method proceeds along the "YES" branch from 417 to 419. In 419 a list is provided for the application administrator to indicate any such suitable vendor components along with any existing components of the application which may be acceptable for performing the action. Various capabilities of the vendor component(s) and internal component(s) are typically indicated as well. The method then proceeds from 419 to 421 where the suitable vendor components are listed along with any components of the existing application which are also suitable. In this way the administrator is provided with a choice between one or more vendor components and existing components for performing the action. Back in block 417, if it is determined that the internal components are suitable and/or there are no outside components from vendors which would possibly be superior to the internal components, the method proceeds from 417 along the "NO" branch to 421. In block 421 the one or more existing components of the application which may be suitable are listed for the application administrator. The method then proceeds to 423 of FIG. 4B.

Turning to FIG. 4B, in block 423 a component is selected for performing the action. If only one suitable component is available the selection process simply defaults to that component. However, if there are several components with varying capabilities that are available then the selection may be based on the mix of capabilities deemed most suitable for the application. The selection may be performed manually by a human administrator, or may be based on an algorithm or subroutine which considering various parameters and features offered by the available components in relation to the needs and goals of the application. The parameters and features include efficiency considerations (e.g., processor requirements, memory requirements, speed or number of keystrokes required to perform the action), security related features (e.g., data security for protecting the application and its data), information capabilities (e.g., the information handling, transmission and display capabilities), look and feel of the component, or other like parameters or features. Once a component has been selected in 423 the method proceeds to 425 to associate a dynamic role with the user.

The process of associating a dynamic role to the user is described further in IBM's copending application Ser. No. 11/351,035 to the same inventor, the contents of said application hereby being incorporated by reference herein in its entirety. The process of assigning a dynamic role in 425 includes assigning permissions, passwords and access keys to the user. Once a dynamic role has been assigned in 425 the method proceeds to 427 where the added component and various settings or other information resulting from the method are stored in the application. This may include the storage of various parameters, settings or options for the component. Upon completing block 427 the method proceeds to 429 and ends.

Figure 5:
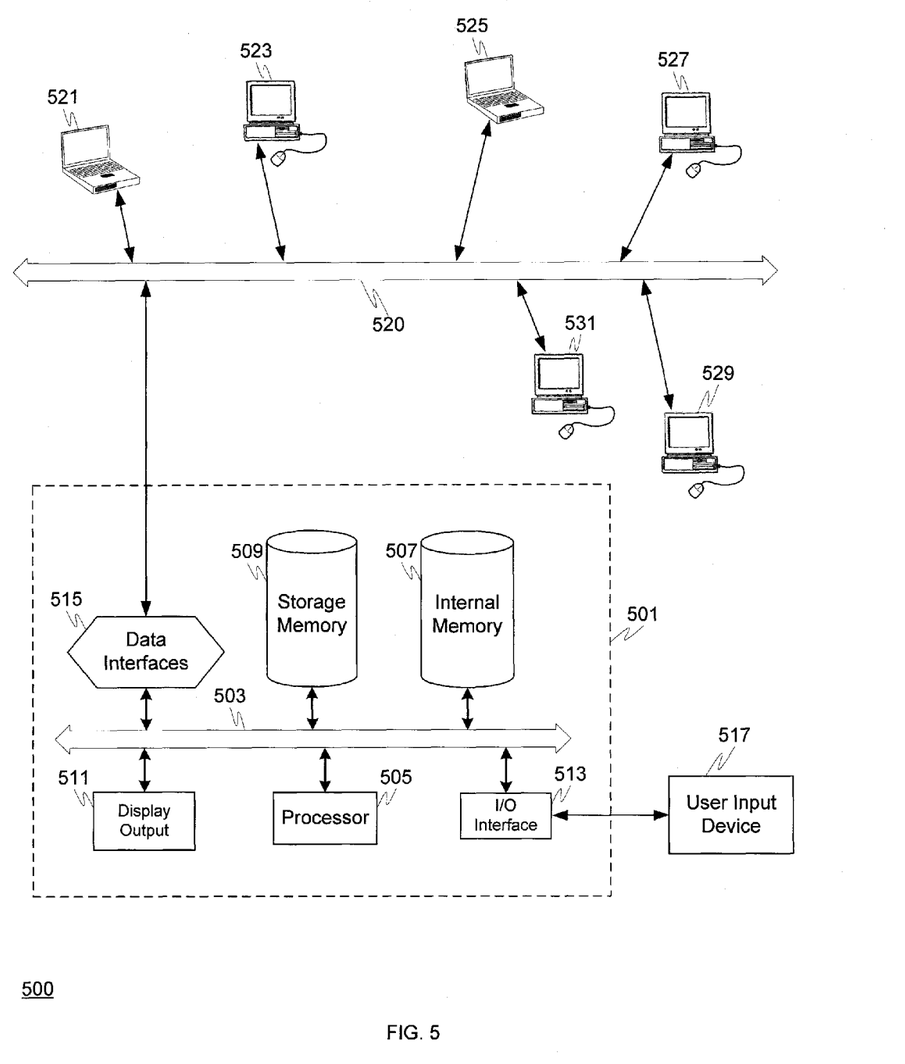
FIG. 5 depicts an exemplary hardware system 500 suitable for implementing the various embodiments of the invention.

FIG. 5 depicts an exemplary hardware system 500 suitable for implementing the various embodiments of the invention. The figure shows a block diagram of a typical information handling system 501 hardware configuration which includes processor 505. The processor 505 may be implemented as a central processing unit (CPU) containing circuitry or other logic capable of performing or controlling the processes, steps and activities involved in practicing the embodiments disclosed herein. The processor 505 may be embodied as either a microprocessor or an application specific integrated circuit (ASIC), may be a combination of two or more distributed processors, or any other circuitry or logic capable of carrying out commands or instructions, for example, the routines for managing the administrative security of a software application and granting authorization to the manageable resources of the application. In various embodiments, the processor 505 may run a computer program or routine which performs one or more of the activities depicted in FIGS. 4A-4B, or otherwise discussed above.

The processor 505 is interconnected to internal memory 507 and storage memory 509. The components of the information handling system 501 are typically interconnected via one or more buses, represented in FIG. 5 as bus 503. For example, the processor 505 is configured to communicate with internal memory 507 and storage memory 509 via the bus 503 or by way of another like type of wired or wireless communication links. Although the bus 503 is depicted as a single bus connecting all of the component parts of the system, the information handling system 501 may include two or more separate buses each connected to a subset of the system components.

The internal memory 507, sometimes referred to as a local memory, may be any of several types of storage devices used for storing computer programs, routines, or code, including the instructions and data for carrying out activities of the various embodiments such as the activities discussed herein. The internal memory 507 and storage memory 509 may be implemented in any form suitable for storing data in a computer system, for example, as random access memory (RAM), read only memory (ROM), flash memory, registers, hard disk, or removable media such as a magnetic or optical disk, or other storage medium known in the art. Either of the memories 507 and 509 may include a combination of one or more of these or other such storage devices or technologies. An application with its platform and any associated resources may be stored in storage memory 509 of the computer system 501, or in another information handling system (e.g., 521-531) being utilized as a server. The internal memory 507 and storage memory 509 may each be configured to store all or parts of a computer program product which performs the various activities in creating a customized wrapper for a web application.

The information handling system 501 also includes one or more input/output (I/O) units such as user display output 511 and user input device 517. The user output display 511 may be implemented in the form of any visual output device, and may be interfaced to bus 503 by a graphics adapter (not shown). For example, the user output display 511 may be implemented as a monitor, such as a cathode ray tube (CRT) or a liquid crystal display (LCD) screen or other like type of computer screen. Typically, the output 511 (e.g., computer screen) displays a view controlled by the application which acts in response to the application being executed by processor 505 or another processor of the system 500. The user output 511 may include one or more audio speakers as well as a video monitor. The information handling system 501 typically includes one or more user input devices 517 such as a keyboard, a mouse, a tablet surface and pen, a microphone and speech recognition routine, or other like types of input/output devices. The user input device 517 may be interfaced to bus 450 by an I/O interface 513. The user output 511 and user input 517 may include other devices known to those of ordinary skill in the art and suitable for use with a computer system.

The information handling system 501 is typically configured to include data interface unit 515 suitable for connecting to one or more networks 520 such as the Internet, a local area network (LAN), a wide area network (WAN), the Public Switched Telephone System (PSTN), a wireless telephone network, or the like. The data interface unit 515 may include a wired and/or wireless transmitter and receiver. The data interface unit 515 may be implemented in the form of multiple units, including, for example, a modem and a network adapter. The information handling system 501 may be connected via the network 520 to one or more other information handling systems, computers, dumb terminals, or telecommunications devices 521-531 which participate in running or carrying out instructions from the application, for example, to implement the various activities disclosed herein.

Various activities may be included or excluded, for example, as described above in conjunction with the figures, and especially FIGS. 4A and 4B. The activities of the method may be performed in a different order than that shown in FIGS. 4A and 4B, yet remain within the scope of at least one exemplary embodiment. For example, in some instances block 409 may be performed before block 407 to determine whether vendor components are available before reviewing the existing components of the application which may be suitable for performing the action.

The invention may be implemented with any sort of processing units, processors and controllers (e.g., processor 505 of FIG. 5) capable of performing the stated functions and activities. For example, the processor 505 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the memories 507-509, e.g. hard disk, CD, flash memory, ram, or other computer readable medium as recognized by one of ordinary skill in the art, or the computer software programs may be transmitted wirelessly to the processing unit. The software application can aid or perform the steps and activities described above. For example, an application in accordance with at least one exemplary embodiment may include: source code for detecting that a user is seeking access to resources, determining the components/resources appropriate for the access, determining the requisite permissions or levels of access to grant to the user, creating the permissions and associating them with the user's dynamic role, storing the settings and user profile, and any other activities performed in carrying out at least one embodiment enabled herein.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method implemented on a computer system connected to the Internet for dynamically configuring software, the method comprising:
    detecting a request to perform an action using an existing configuration of the software;
    retrieving a security role for a user account associated with the request, said security role defining an extent of access to the existing configuration;
    determining that the security role with the existing configuration is insufficient to perform the action;
    determining whether a vendor software product is available to perform said action by connecting to a vendor website via the Internet;
    indicating additional software for potentially adding to the existing configuration, said additional software being capable of performing the action; and
    automatically acquiring said vendor software product for performing the action.

2. The method of claim 1, wherein the existing configuration comprises a software application, and the additional software is a component that is not part of the existing configuration when the request to perform the action is detected.

3. The method of claim 1, wherein the existing configuration is not capable of performing the action.

4. The method of claim 1, wherein the step of determining comprises checking a list stored with the existing configuration.

5. The method of claim 1, wherein the step of determining results in a plurality of vendor software products being available to perform said action, the method further comprising:
    providing a list of the plurality of software products.

6. The method of claim 1 wherein the existing configuration is capable of performing the action, the method further comprising:
    determining whether a vendor software product is available which is more suitable for performing said action than the existing configuration.

7. A computer program product for dynamically configuring software, the computer program product comprising a non-transitory computer useable medium including a computer readable program, wherein the computer readable program upon being executed on a computer causes the computer to:

detect a request to perform an action using an existing configuration of the software;

retrieve a security role for a user account associated with the request, said security role defining an extent of access to the existing configuration;

determine that the security role with the existing configuration is insufficient to perform the action;

in response to determining that the existing configuration is not capable of performing the action, determine whether a vendor software product is available which is more suitable for performing said action than the existing configuration; and indicate additional software for potentially adding to the existing configuration, said additional software being capable of performing the action.

8. The computer program product of claim 7, wherein the existing configuration comprises a software application, and the additional software is a component that is not part of the existing configuration when the request to perform the action is detected, the computer program product further causing the computer to:

determine whether a vendor software product is available to perform said action.

9. The computer program product of claim 8, wherein determining whether the vendor software product is available comprises connecting to a vendor website via the Internet.

10. The computer program product of claim 9, further causing the computer to:

automatically acquiring said vendor software product for performing the action.

11. The computer program product of claim 8, wherein determining whether the vendor software product is available comprises checking a list stored with the existing configuration.

12. The computer program product of claim 8, wherein computer program product results in a plurality of vendor software products being available to perform said action, the computer program product further causing the computer to:

provide a list of the plurality of software products.

13. A system for dynamically configuring software, the system comprising:

a memory configured to store an existing configuration of the software;

logic for detecting a request to perform an action using the existing configuration;

logic for retrieving a security role for a user account associated with the request, said security role defining an extent of access to the existing configuration;

logic for determining that the security role with the existing configuration is insufficient to perform the action;

means for connecting to a vendor website via the Internet;

logic for determining whether a vendor software product is available to perform said action;

logic for indicating additional software for potentially adding to the existing configuration, said additional software being capable of performing the action; and logic for automatically acquiring said vendor software product for performing the action.

14. The system of claim 13, wherein the existing configuration comprises a software application and the additional software is a component that is not part of the existing configuration when said request to perform the action is detected.

* * * * *